United States Patent
Murphy et al.

(10) Patent No.: US 8,518,569 B2
(45) Date of Patent: Aug. 27, 2013

(54) INTEGRATED FRAME BATTERY CELL

(75) Inventors: R. Sean Murphy, Sunnyvale, CA (US); Thomas W. Wilson, Jr., Saratoga, CA (US)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 12/714,737

(22) Filed: Mar. 1, 2010

(65) Prior Publication Data

US 2011/0210954 A1    Sep. 1, 2011

(51) Int. Cl.
*H01M 2/12*    (2006.01)
*H01M 2/36*    (2006.01)
*H01M 6/12*    (2006.01)

(52) U.S. Cl.
USPC ............... 429/82; 429/162; 429/163; 429/72

(58) Field of Classification Search
USPC ..................... 429/82, 162, 163, 72
See application file for complete search history.

(56) References Cited

U.S. PATENT DOCUMENTS

| | | | |
|---|---|---|---|
| 6,218,041 | B1 | 4/2001 | Barbier et al. |
| 2007/0184341 | A1 | 8/2007 | Yoon et al. |
| 2008/0054849 | A1 | 3/2008 | Kim |
| 2008/0081254 | A1 | 4/2008 | Kim et al. |
| 2008/0171239 | A1* | 7/2008 | Tucker et al. .......... 429/13 |
| 2008/0241654 | A1 | 10/2008 | Koh et al. |

FOREIGN PATENT DOCUMENTS

| | | |
|---|---|---|
| EP | 0 917 218 A2 | 5/1999 |
| JP | 2004-192966 | 7/2004 |
| JP | 2008-146963 | 6/2008 |

OTHER PUBLICATIONS

Office Action in Chinese Application No. 201120343485.6, Aug. 16, 2012.
Chinese Office Action dated Feb. 16, 2012 from Chinese Application No. 201120343485.6 (English translation provided).
International Search Report dated Apr. 21, 2011 in PCT Application No. PCT/US2010/062445.
Written Opinion dated Apr. 21, 2011 in PCT Application No. PCT/US2010/062445.

* cited by examiner

*Primary Examiner* — Helen O Conley
(74) *Attorney, Agent, or Firm* — Womble Carlyle Sandridge & Rice LLP

(57) ABSTRACT

An electrolyte containment structure for an electrode jelly roll and electrolyte in a portable power source is described. The electrolyte containment structure comprises metal foil, such as metal foil sleeve, coupled to and partially surrounding a rigid frame. The rigid frame can protect the electrode jelly roll edges from crush events. To prevent shorts, the metal foil can be coated in plastic, which can insulate the metal foil from the electrode jelly roll. Further, the plastic can serve as a bonding and sealing agent. For instance, the metal foil can be coupled to the rigid frame using a thermal bonding method involving melting of the plastic. The rigid frame can provide a platform for connector pads and safety circuitry associated with the portable power source. The connector pads and safety circuitry can be assembled as modular components, which can simplify the assembly process The containment structure provides features associated with a pouch cell battery design, such as a light-weight metal foil pouch, but can be utilized in a portable computing device without being enclosed in a hard casing traditionally associated with pouch cell battery designs.

17 Claims, 6 Drawing Sheets

INTEGRATED FRAME BATTERY CELL

BACKGROUND OF THE INVENTION

1. Field of the Invention

The described embodiments relate generally to batteries for portable computing devices. More particularly, the present embodiments relate to battery packaging designs for portable computing devices.

2. Description of the Related Art

A design of a portable computing device can involve complex tradeoffs. A few factors that can be considered in the design process are cosmetic appeal, weight, manufacturability, durability, thermal compatibility and power consumption. A component that is selected on the basis of its positive contribution to one of these design factors can have an adverse impact on one of more other design factors.

A portable power source, typically, a battery of some type is an important component in the design of a portable computing device. The portable power source provides operating power for the portable computing device when it is not near a fixed power source, such as a wall outlet. Factors in selecting a portable power source can be energy density, form factor and durability.

Energy density can refer to the amount of energy per given volume or per given mass that the portable power source is capable of delivering to the portable computing device. The form factor can refer to the shape of the package containing the portable power source. For instance, portable computing devices that are slim require an overall form factor for the portable power source that is also slim. The durability can relate to containment of any damaging elements associated with a battery cell. For example, portable power sources often include liquid or gel type electrolytes that need to be contained to prevent damage to other electronic components where the packaging needs to be durable enough to contain these damaging elements under normal operational conditions.

The energy density for a portable power device, such as a battery, can be affected by the type battery cell that is employed and its associated packaging. The packaging design can affect the energy density in a number of ways. First, the energy density per mass will decrease as the mass of the packaging increases. The packaging decreases the energy density per mass because it adds mass to the system without providing additional energy. The mass of the packaging design can be constrained by durability considerations.

Second, the energy density per volume is affected by packing efficiency where the packing efficiency can be constrained by a desired form factor for the packaging design. An inefficiently packaged battery cell can have a lower energy density per volume than an efficiently packaged battery cell. As the energy density per volume decreases, the volume taken up by the portable power device increases, which can be undesirable for utilization with a portable computing device.

In a portable computing device, it is generally desirable to minimize the weight and volume of each component while still maintaining desired functionality and performance levels. Therefore, it would be beneficial to provide a housing assembly for a battery useable in at least a portable computing device that is durable, lightweight and efficiently packaged. It would also be beneficial to provide methods for assembling the battery that meet the above conditions and perform satisfactorily during operational cycling of the device.

SUMMARY OF THE DESCRIBED EMBODIMENTS

This paper describes various embodiments that relate to systems, methods, and apparatus for enclosures for use in portable computing applications.

In one aspect, a portable power source and its method of manufacture is described. The portable power source can be used in portable power devices such as but not limited to laptop computers, netbook computers, smart phones and portable media players. The portable power source can include a containment structure for enclosing an electrode and an associated electrolyte in a battery cell, such as a lithium-ion polymer battery cell. The containment structure can prevent leakage of the electrolyte or gasses generated during operation of the portable power source.

The containment structure can include a rigid frame and a metal foil bonded to the rigid frame where the metal foil encloses a portion of the rigid frame, the electrode assembly and the electrolyte. The rigid frame can protect an electrode, such as edges of the electrode jelly roll, from crush events, which can damage the electrode. To prevent shorts, the metal foil can be coated in plastic, which can insulate the metal foil from the electrode of the battery cell. Further, the plastic can serve as a bonding and sealing agent. For instance, the plastic, via a thermal bonding method, can be melted to bond the metal foil to the rigid frame and to form an air-tight seal for containing a liquid or gel electrolyte associated with the battery cell.

An electrical connector pad and safety circuitry can be coupled to the rigid frame. The electrical connector pad can allow power to drawn from or added to the portable power source. The safety circuitry can be electrically coupled to the electrical connector pad and the anode and the cathode of the electrode assembly. In particular embodiments, the safety circuitry and the electrical connector pad can be an integral component of the rigid frame or can be provided as a modular component that is coupled to the rigid frame during assembly. Providing the safety circuitry and electrical connector pads in this manner can simplify the assembly process.

In another embodiment, the rigid frame can include an injector port that allows the electrolyte to be added to the containment structure during assembly of the portable power source. The injector port can be aligned with an axis around which an electrode jelly roll is wound to allow the electrolyte to be injected in an axial direction. Injecting the electrolyte in this manner can allow for a faster assimilation of the electrolyte into the electrode jelly roll as compared to when the electrolyte is injected in a transverse direction.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following relates to housing assemblies for portable power source, such as a battery. The portable power source can be suitable for a portable computing device such as but not limited to a laptop computer, netbook computer, tablet computer, smart phone, a portable media player, etc. In particular, the housing assembly comprises a rigid frame integrated into the pouch of a pouch type battery cell. A portion of the rigid frame can provide containment for a liquid electrolyte associated with the battery. The rigid frame can include an electrical interface, safety circuitry and voltage conditioning circuitry.

Figure 1:
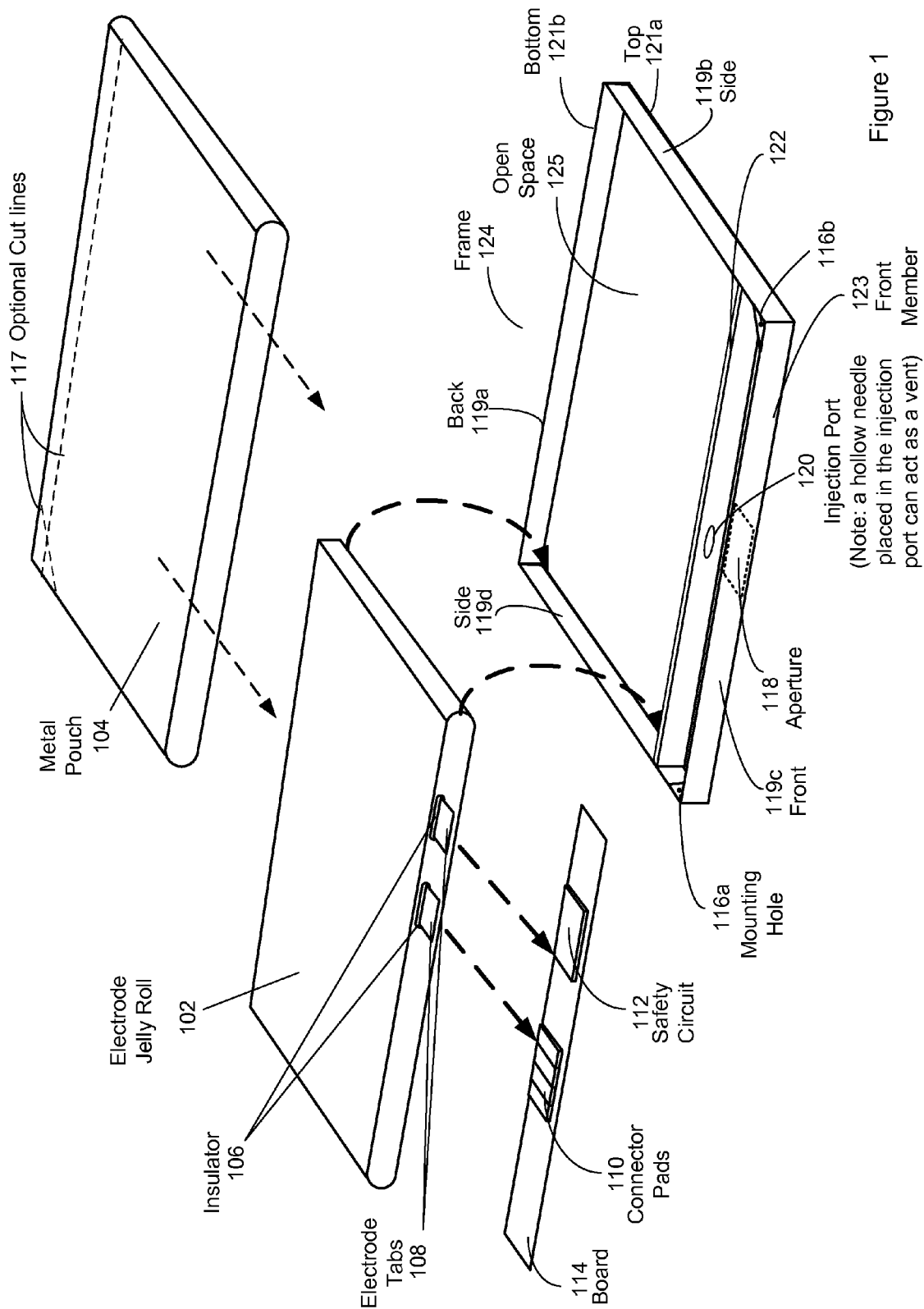
FIG. 1 shows a perspective view of components of a portable power source prior to assembly.
Figure 2:
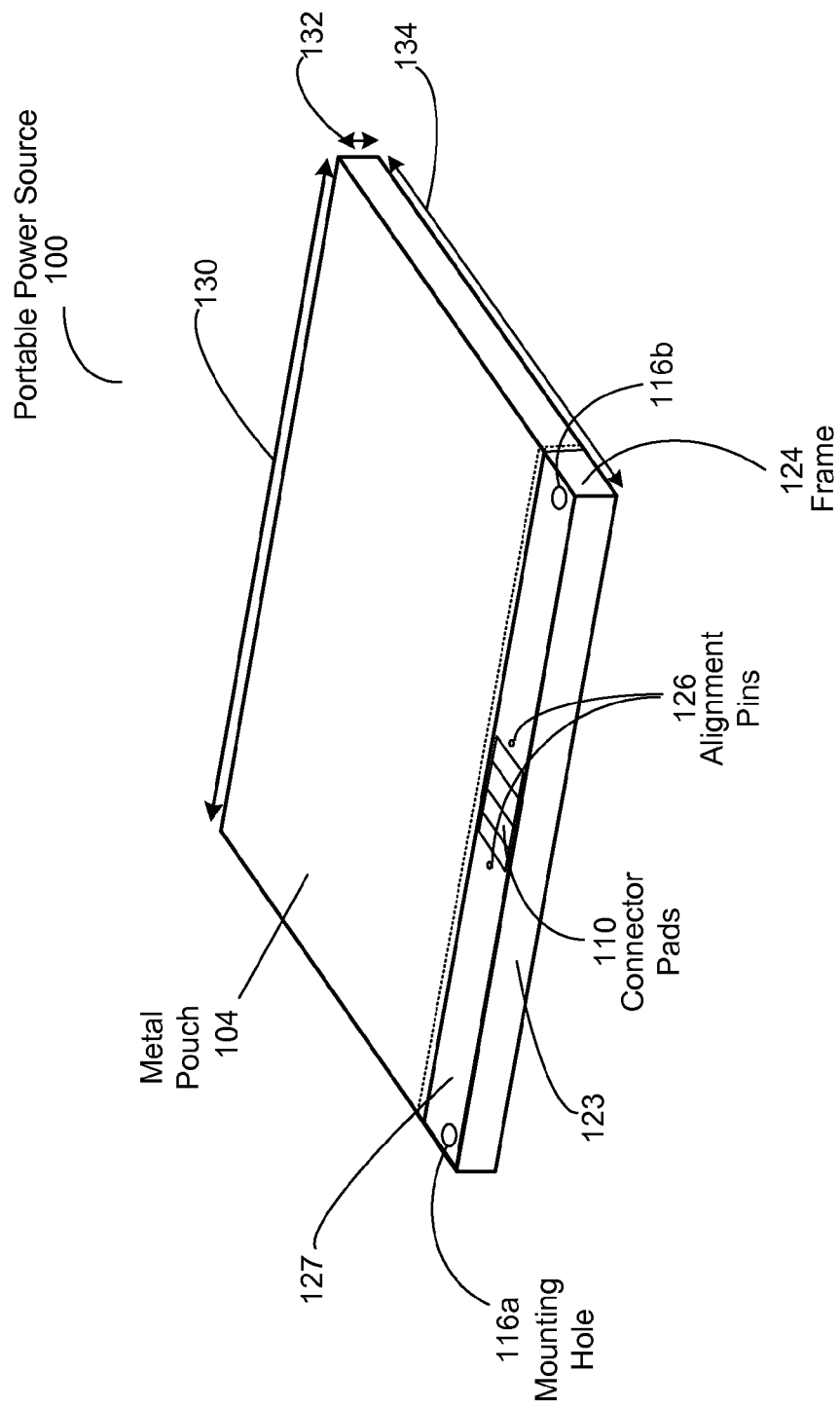
FIG. 2 shows a perspective view of a portable power source after assembly.

A general description of a 'pouch cell' type battery including a rigid frame is described with respect to FIG. 1. In FIG. 1, pre-assembled components including a metal pouch, electrode jelly roll and a frame are shown. In FIG. 2, the components after assembly are shown. Alternate embodiments of forming a pouch cell with an integrated frame are described with respect to FIGS. 3, 4A and 4B. In FIG. 5, a portable computing device including multiple power sources distributed in a device casing are shown. A method of assembling a pouch cell battery with a rigid frame is described with respect to FIG. 6. However, those skilled in the art will readily appreciate that the detailed description given herein with respect to these figures is for explanatory purposes as the invention extends beyond these limited embodiments.

FIG. 1 shows a perspective view of components of a portable power source 100 prior to assembly. A perspective view after assembly is shown in FIG. 2. The portable power source can comprise a metal pouch 104 or metal sleeve, an electrode jelly roll assembly 102 (often denoted as a 'bare cell') and a frame 124 and a board 114 including connection circuitry. The electrode jelly roll 102 can comprise a sheet with a number of layers, such as a layer of cathode material, a layer of anode material and a separator material between the anode and cathode layer. The sheet can be rolled or folded up to from the electrode jelly roll. In one embodiment, the cathode material can include lithium. The lithium anode material along with a suitable cathode material, such as porous carbon, can be used to form a lithium ion type battery.

In a particular embodiment, a liquid or gel electrolyte can be used with the electrode jelly roll 102. A lithium ion battery is an example of a battery system using a liquid or gel electrolyte. In another embodiment, a dry electrolyte, such as a polymer electrolyte can be used with the electrode jelly roll 102. A dry lithium polymer battery is one example of battery system employing a dry electrolyte. In particular embodiments, a gel or liquid electrolyte can be used in combination with a dry electrolyte, such as the polymer electrolyte. For instance, a lithium ion polymer battery uses a polymer electrolyte in combination with a liquid or gel electrolyte. The liquid or gel electrolyte can be added to improve the conductivity of the battery system at lower temperatures, such as at room temperature conditions or colder.

The electrode jelly rode 102 can comprise electrode tabs 108. The electrode tabs can include a positive and a negative tab. The electrode tabs can be covered by an insulator, such as 106. The insulator 106 can be used to prevent shorts from occurring across the two electrode tabs. For instance, a short could occur if the metal pouch 104 came into contact with bare portions of each electrode tab 108.

The metal pouch 104 can be formed from a metal foil, such as an aluminum foil. The metal foil can be coated with a laminate layer, such as a plastic laminate layer. The laminate layer can be used for heat sealing purposes. For example, in one embodiment, a metal pouch 104 can be formed by starting with a rectangular metal foil sheet coated with a laminate layer. The opposite ends of the rectangular metal foil sheet can be overlapped and pressed together. Then, heat can be applied along the overlapped edge to melt the laminate layer and join the two overlapped edges together to form a metal sleeve.

Further, the plastic laminate layer can insulate the metal foil from the electrode jelly roll 102. A contact of the metal in the metal foil pouch 104 with the electrode jelly roll 102 can result in electrical shorts. The plastic laminate layer, acting as an insulator, can prevent the metal in the metal foil pouch 104 from contacting the electrode jelly 102 roll and causing a short circuit to occur.

In another example, two sheets of a metal foil coated with a laminate can be utilized. One sheet of metal foil can be stacked on top another sheet of metal foil. Then, opposite sides of the two sheets can be pressed together and heat sealed proximate to the edges to again form a metal sleeve.

The sheets can be joined such that the laminate layer is located on an inner surface of the metal sleeve. The inner surface can face and can be in contact with the electrode jelly roll 102 after assembly. The laminate layer can be a plastic polymer, such as but not limited to polypropylene or polyethylene.

Next, one edge of the metal sleeve can be pressed together and then heat can be applied along the pressed together edge to seal one end of the metal sleeve to form a pouch, such as metal pouch 104. In particular embodiments, the metal foil layer can be about 80-120 microns thick. In other embodiments, the metal foil layer can be as thick as 140 microns. The thickness of the foil layer can be increased to increase durability and damage resistance.

In yet other embodiments, other bonding agents, such as a liquid adhesive can be applied to bond various components together, such as to seal an end of a metal sleeve to form a pouch. In this embodiment, heat sealing may not be used or can be used in conjunction with the liquid adhesive. A seal can be formed when the liquid adhesive dries. In other embodiments, a combination of heat sealing and/or other bonding schemes, such as the use of a tape or a liquid adhesive can be used to bond one or more components together including but not limited to forming a seal.

The electrode tabs 108 of the electrode jelly roll 102 can be welded to electrical contacts on board 114. The board 114 can provide a substrate for various electrical components, such as the safety circuitry 112 and electrical connector pads 110. The board can be constructed from a material, such as a plastic, and other suitable materials useful with printed circuit boards (PCBs).

The board 114 can be provided as a modular component or can be an integrated component of the rigid frame 124, described below. When the board 114 is provided as an integral or modular component to the rigid frame, the assembly process can be simplified because the rigid frame can provide a more stable platform for the assembly process than assembling this circuitry separately from the rigid frame 124. Further, securing the board 114 to the rigid frame 124 can prevent disconnects that can occur when the circuitry is merely "hanging" from the electrode jelly roll 102, such as disconnects resulting from the circuitry snagging on something during manufacture.

The electrical contacts can connect the electrode jelly roll to safety circuitry 112. The safety circuitry 112 can be configured to cut off current from the electrode jelly roll 102 in response to a condition of the electrode jelly roll 102 at the electrode tabs 108. As an example, the safety circuit can be configured to shut down the battery when it is charged above a certain voltage level and discharged below a certain voltage level. In a particular embodiment, the safety circuitry 112 can include an element, such as a thermal interrupt that opens a circuit in response to an over current and/or overcharging conditions.

In particular embodiments, the safety circuitry 112 can include one or more sensors for detecting conditions of the electrode jelly roll, such as current and voltage levels. This information can be used to determine a charge remaining in the electrode jelly roll 102. In addition, other safety features that can be associated with the portable power source include but are not limited circuitry or a device that responds 1) to over-temperature conditions, such as a shut down separator and 2) internal pressure conditions, such as a tear-away tab or a vent.

The safety circuitry 112 can be interposed between the electrode tabs 108 and the connector pads 110. The connector pads 110 provide an external interface that allows power to be drawn the portable power device after assembly. The board 114 can also include power conditioning circuitry (not shown). In one embodiment, the power conditioning circuitry can allow the voltage output from portable power device to be altered. For instance, the voltage output by the electrode jelly roll 102 (after assembly) can vary according to its charge state. The power conditioning circuitry can increase or decrease voltages to match voltage requirements needed by an electronic component receiving power from the portable power source. In some embodiments, as discussed with respect to FIG. 5, a portable computing can comprise multiple power sources and the power conditioning circuitry can be configured to adjust output voltages based upon the charge states of one or more of the power sources.

The portable power source can include a frame 124. The frame can be constructed from a plastic material, such a polypropylene. The frame material can be selected such that it can form a heat-sealed bond with the plastic laminate of the metal pouch 104. The frame 124 can be more rigid than the metal foil pouch 104 such that it provides structural rigidity to the assembled portable power source 100 (see FIG. 2). The additional rigidity can prevent damage to the electrode jelly roll 102 that could result from the roll being bent or twisted.

Further, the edges of the electrode jelly roll 102 can be susceptible to damage resulting from the edges of the electrode jelly 102 being crushed. For instance, crush events can occur while the portable power source is being assembled. The rigid frame can protect the edges of the electrode jelly roll from being crushed.

For the purposes of discussion, the frame 124 can be described as having sides, 119b and 119b, a front 119c and a back 119d, top 121a and a bottom 121b. In FIG. 1, the frame is shown bottom side up. In a particular embodiment, the frame 124 can be rectangular with a transverse member 124. The frame can be sized so that it surrounds the electrode jelly roll 102, i.e., the electrode jelly roll fits within the space 125 provided by three sides of the frame 124 and the transverse member 122. The board 114 can be sized such that it fits between the transverse member 122 and front member 123. Members 122 and 123 can be connected by a solid surface on the top side 121a to form a cavity. The top side solid surface can include an aperture 118. The aperture is configured to allow access to the connector pads 110 on board 114.

In one embodiment, the board 114 can be provided as an integral component of frame 124. The connector pads 110 and safety circuitry 112 can be built into the frame 124 during manufacture of the frame 124. Thus, in some instances, the board 114 may not be assembled as a separate piece from frame 124.

The frame 124 can comprise additional structure, such as the structure the around two mounting holes 116a and 116b. A screw or some other type of fastener can inserted through the mount holes 116a or 116b to allow the portable power source to be coupled to another structure, such as a frame or a casing associated with a portable computing device. In other embodiments, one or more mounting holes can be placed at various locations around frame 124 and is not limited to two mounting holes in the locations shown in FIG. 1. In yet other embodiments, the frame may not include mounting holes but may include a ledge or other structure that can be used with a fastener to secure the portable power source to another structure.

To assemble the portable power source, the electrode tabs 108 can electrically coupled to contacts on the board 114. Then, the electrode jelly roll assembly 102 and board 114 can be placed within the frame 124 such that the board 114 fits within the space between the members 122 and 123 with the connector pad 110 surrounded by aperture 118. The connector pads 110 are accessible through the top 121a of the frame. The electrode assembly 102 and the board 114 are shown being flipped over prior to being placed in the frame 124. As the board 114 and electrode assembly 102 can be assembled in the opposite orientation, this motion is not necessary and is shown for illustrative purposes only.

In some embodiments, the frame 124 can include a ledge on which the electrode jelly roll 102 can rest. The ledge could extend all around the sides of space 125, could just be located proximate to the corners. Also, the ledge could span only a portion of each side, such as small tabs that extend into space 125 located at the midpoint of each side. Again, these tabs can support the electrode jelly roll 102 when it is placed in the frame 124.

The board 114 and/or a portion of the electrode tabs 108 can be bonded to the frame 124. For example, a liquid adhesive, such as an epoxy resin, can be used to bond the board 114 to frame 124. It may be desirable to bond the electrode tabs 108 and/or the insulator surrounding the electrode tables to the frame to prevent leakage of electrolyte and/or venting of gasses between the electrode tabs and the frame 124.

In embodiments, where the connector pads and safety circuit 112 are integral components of frame 124, the frame 124 can comprise two contact points for coupling the electrode tabs 108 to the frame and the associated circuitry located within the frame. For example, electrical contact points can be located on a side of the member 122 facing the electrode jelly roll 102 when it is surrounded by the frame, i.e., side facing towards back 119a. The electrode tabs 108 can include an end portion bent proximately 90 degrees to the orientation shown in FIG. 1. The end portion can be welded to the contacts on the surface of member 122.

In another embodiment, the member 122 can comprise two slots on the side facing the electrode jelly roll 102 through which the electrode tabs 108 can be inserted. The electrode tabs 108 can be welded into to these slots. In yet other embodiments, the contact points for the electrode tabs 108 can be located in other locations, such as in the trough areas between members 122 and 123.

In another example, a small surface is shown around each of the mounting holes 116a and 116b, which are surrounded by the trough area. Rather than small surfaces surrounded by the trough area, the surface can extend between members 122 and 123 such that the trough area is eliminated and the surface is parallel with the bottom 121b. The electrical contact points for the electrode tabs 108 can be located on this surface.

After the electrode jelly roll 102 is coupled to the frame 124, the metal pouch 104 can be slid over the frame 124 and electrode jelly roll 102. The metal pouch 104 can be bonded to the frame 124 to form a containment structure for a liquid or gel electrolyte associated with electrode jelly roll 102. The bond between the frame 124 and the metal pouch 104 can act as a barrier to prevent leakage of an electrolyte and gasses associated with the electrode, such as the electrode jelly roll.

In one embodiment, an inner surface of the metal pouch 104 proximate to the open end can be bonded to the frame 124 proximate to the transverse member 122, i.e. on an outside portion of side 119b proximate to the intersection of side 119b and transverse member 122. Again, the bond can be formed using a heat sealing approach. As previously described, the inner surface of the metal pouch 104 can include a plastic laminate layer that is compatible with the material of frame 124 such that a leak-proof bond can be formed between the metal foil and the frame 124.

The thermal bond can be generated by applying heat using a heating element of some type to the metal foil of the metal pouch 104. The heat from the heating element can be conducted through the metal foil and melt and underlying laminate layer to bond the metal foil to the frame 124. The thermal bond can extend along a top and a bottom edge of member 122 and along the sides of frame 124 in a line connecting the top and bottom edges, i.e., around the corners. The thickness of member 122 can be selected such that there is a large enough surface area along the edge of member 122 to form an adequate leak proof bond between the frame 124 and the metal pouch 104.

In general, bonds, such as thermal bonds, can be generated between the frame 124 and the metal pouch 104 that conform to the geometry of the frame and are not limited to forming bonds around only frames with corners. For example, a bond can be formed between the metal pouch and the frame when the frame includes a more rounded surface, such as a rounded corner. In another example, the frame 124 could include a step and the metal pouch 104 could be bonded to the frame to form a leak proof seal across the step.

The metal pouch 104 can be thermally bonded to the frame 124 in other locations, such as along sides 119a and 119d of frame 124, on an outside portion of back side 119a, along the top 121a and bottom 121b edges of portions of each side, etc., to prevent slippage between the frame 124 and the metal pouch 104. In this instance, the bond may not be necessary to prevent leakage from the containment structure formed by the metal pouch 104 and the frame 124. Thus, in some bond areas, the metal pouch 104 can be bonded to the frame 124 to prevent leakage and in other areas, the metal pouch can be bonded to the frame 124 to allow the frame to add rigidity and provide support to the metal pouch 104.

After bonding the metal pouch 104 to the frame 124, a liquid or gel electrolyte can be added. In one embodiment, the member 122 can include an injection port 120 for adding the electrolyte. The injection port 120 can be a piece of rubber pre-bonded to member 122. A needle containing the electrolyte can be inserted through the rubber piece of the injection port and then the electrolyte can be injected into the containment structure comprising the metal pouch 104 and frame 124. When the needle is removed the rubber contracts to seal in the electrolyte. In this embodiment, the electrolyte can be injected in the direction of the axis around which the electrode jelly roll 102 is wound.

Injecting the electrolyte in the direction of the axis around which the electrode jelly roll is wound can allow for faster assimilation of the electrolyte into the jelly roll as compared to when the electrolyte is injected transversely to the axis. The faster assimilation of the electrolyte can decrease a manufacture time associated with assembling the portable power source. A decreased manufacture time can increase a production throughput and reduce manufacturing costs.

After a time period sufficient time period to allow the electrolyte to diffuse into the electrode jelly roll 102, excess gasses can be evacuated from containment structure. For instance, in one embodiment, the portable power source can be placed in a vacuum and a hollow needle can be placed in the injection port 120 to allow gasses to escape from the containment structure to the vacuum via the hollow needle. Next, the needle can be removed and the injection port can be further sealed if desired. For instance, an epoxy resin or some other sealant can be placed over the injection port.

In other embodiments, after the electrolyte is added to the containment structure surrounding the electrode jelly roll 102, excess gasses can be evacuated by making a cut in the metal pouch, such as at a corner or along the back edge (non-open end of the metal pouch 104). Example cut lines 117 are shown in the figure. The closed end of the metal pouch can extend past a back side 119a of the frame 124 to facilitate a cut. After a cut is made, the metal pouch can be heat sealed at the location of the cut to reseal the pouch. For instance, the cut edges can be pressed together and heat sealed Excess material can be folded and possibly bonded (e.g., taped) to the back side 119a of frame 124 if desired.

In some embodiments, cutting can be used in lieu of the injection port 120. For instance, after the metal pouch 104 is coupled to the frame 124, a hole can be cut in the metal pouch 104, the electrolyte can be injected through the hole and then the pouch resealed. In another embodiment, the metal pouch 104 can be formed as a sleeve that is slipped over the frame 124. One end of the sleeve can be bonded to the frame 124 (other portions of the sleeve can also be bonded to the frame at this time), then the electrolyte can be added through the other, open end of the metal sleeve proximate to the back side 119a of frame 124. Next, the open end of the metal sleeve can be sealed and the electrolyte allowed to diffuse as previously described. In yet other embodiments, rather than using a metal pouch, the electrode jelly roll 102, board 114 and frame 124 can be placed on a metal sheet, such as an aluminum foil sheet. In manners previously described, the edges of the metal sheet can be folded, bonded to itself and bonded to the frame 124 to form a containment structure for the electrolyte.

In a particular embodiment, the metal pouch 104 can placed around the frame 124, board 114 and electrode jelly roll 102 such that these elements are initially entirely enclosed. The metal pouch 104 can be bonded to the frame 124 at various locations, such as but not limited to along the back 119a, along the sides 119b and 119d, along the front side 119c, along edge 122 and/or around the aperture 118 on the top surface surrounding the aperture. The connector pads 110 can be initially covered by the metal pouch 104 and then a portion of the metal pouch 104 covering the connector pads 110 can be removed to expose the connector pads. Also, a portion of the metal pouch 104 can be removed or the metal pouch can be punctured to expose mounting holes 116a and 116b if desired. As previously described, the metal pouch can be cut and then resealed to add electrolyte and to evacuate gasses from the containment structure formed by the combination of the metal pouch 104 and the frame 124.

FIG. 2 shows a perspective view of a portable power source 100 after assembly of the components described with respect to FIG. 1 for one embodiment. The portable power source 100 is of a length 134, width 130 and height 132. These dimensions can be varied. For instance, the height 132 of the battery can be between 3-6 mm although smaller and larger thicknesses are possible. The thickness of the electrode jelly roll can be varied depending on the thickness 132 of the portable power source 100. Thus, more or less windings can be associated with the jelly roll electrode enclosed by the metal pouch 104 and frame 124 depending on the selected thickness of the portable power source 100. The thickness 132, as well as the length 134 and width 130 of portable power source 100 can be selected to meet space requirements of a portable computing device for which the portable power source is utilized.

In one embodiment, connector pads with common dimensions 110 can be used that do not change when the dimensions of the battery change. For instance, the same sized connector pads can be used with a battery that is 3 mm thick or a battery that is 6 mm thick or when the length 130 and the width 134 of the portable power source are changed. The frame 124 can include small depressions or bumps proximate to the connector pads 110. These bumps or depressions can be used to align the connector pads with other electrical interfaces. Alignment pins 126 (bumps) are shown in the figure.

The connector pads 110 are not limited to the location on surface 127 shown in FIG. 2. For example, the connector pads 110 can be located at other locations along surface 127. As another example, the connector pads 110 can be located on a front surface of member 123. Frames can be constructed that allow for the connector pad to be located on any portion of an outer portion of the battery 100.

In particular embodiments, the battery 100 can comprise multiple connector pads, such as two or more connector pads. Multiple connector pads can allow multiple batteries to be coupled together. For example, two batteries can be coupled together side to side or two batteries can be stacked on top of another. The two batteries that are coupled together do not necessarily need to have the same dimensions. Allowing batteries of different dimensions to be coupled together may allow for a better utilization of available space within a portable computing device.

Figure 3:
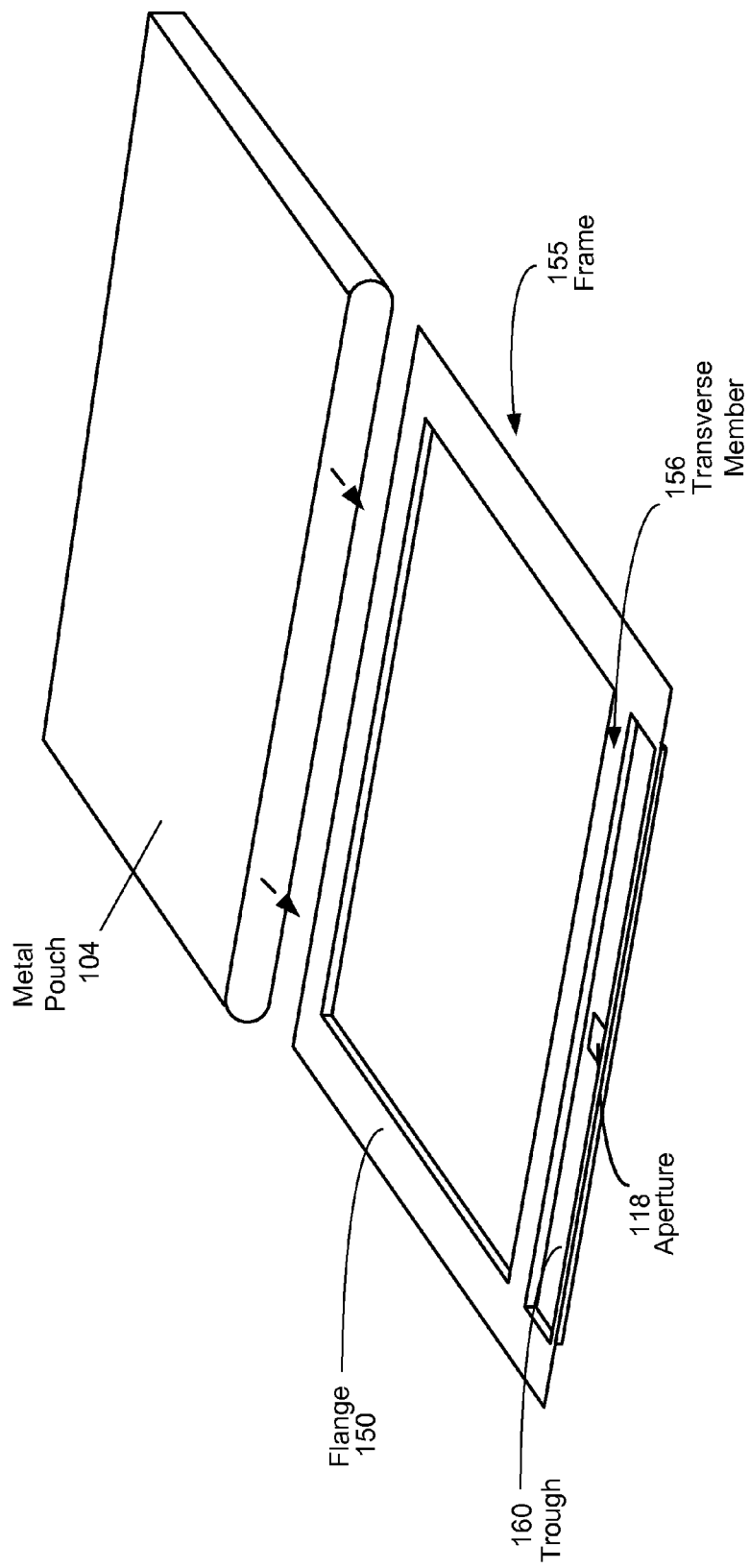
FIG. 3 is a front view of an unassembled containment structure for enclosing an electrode and associated electrolyte for one embodiment.

FIG. 3 is a front view of an unassembled containment structure for enclosing an electrode and associated electrolyte. The electrode and electrolyte can be an electrode jelly roll as described with respect to FIGS. 1 and 2. The shape of the electrode can be proximately rectangular. The containment structure includes a frame 155 and a metal pouch. The rigid frame 155 can comprise a transverse member 156, a trough 160 with an aperture 118. The aperture can be used for electrical connector pads as described with respect to FIGS. 1 and 2.

As compared to the frame 124 in FIGS. 1 and 2, frame 155 comprises a number of flanges 150 and a wider transverse member 156. The flange 150 can be thinner than the maximum thickness of the frame 155. For example, the maximum thickness of the frame 155 can be proximately the height of the electrode jelly roll assembly, such as 3-6 mm thick, while the thickness of the flange is thinner, such as 1 mm thick. The transverse member can have the same thickness as the flange. The flange width can vary and does not have to be a constant width on all sides of the frame.

The flange 150 can provide an increased bonding area to which the metal foil pouch 104 can be coupled to the frame 155. As previously described, the metal foil pouch can be 104 thermally bonded to the frame 155 to form a containment structure for an electrode assembly and its associated electrolyte. The metal foil pouch 104 can be bonded to the frame on a top and a bottom surface of the transverse member 156. The metal pouch can be bonded to the frame 155 on a top surface of the flange, a bottom surface of the flange or combinations thereof. In some embodiments, a board can be inserted in the trough 160 and bonded to the frame 155. The metal pouch 104 can also be bonded to the bottom of the board after it has been inserted.

Figure 4A:
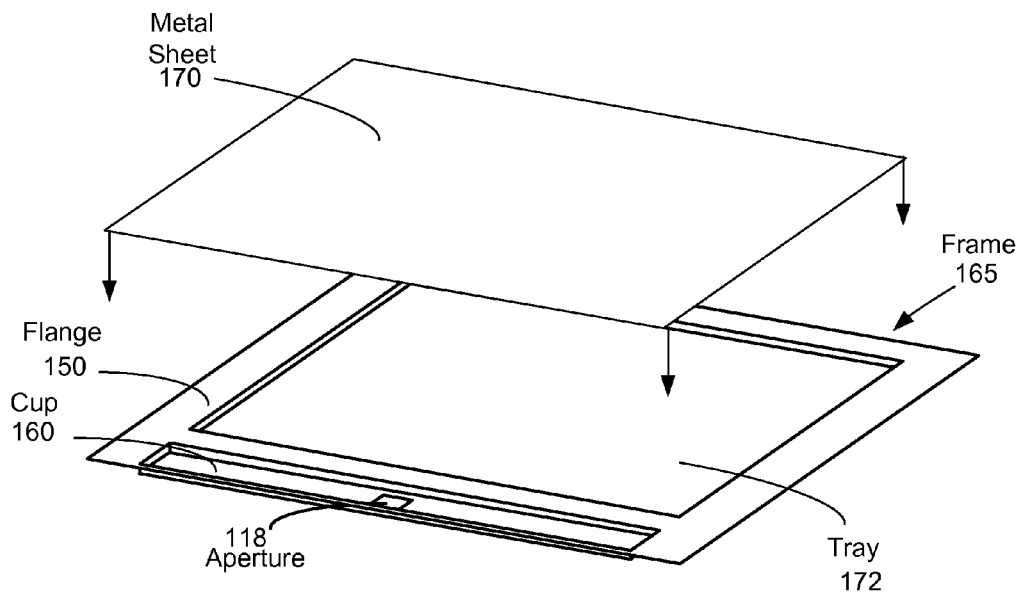
FIGS. 4A and 4B are a front view of an unassembled containment structure for enclosing an electrode and associated electrolyte for various embodiments.
Figure 4B:
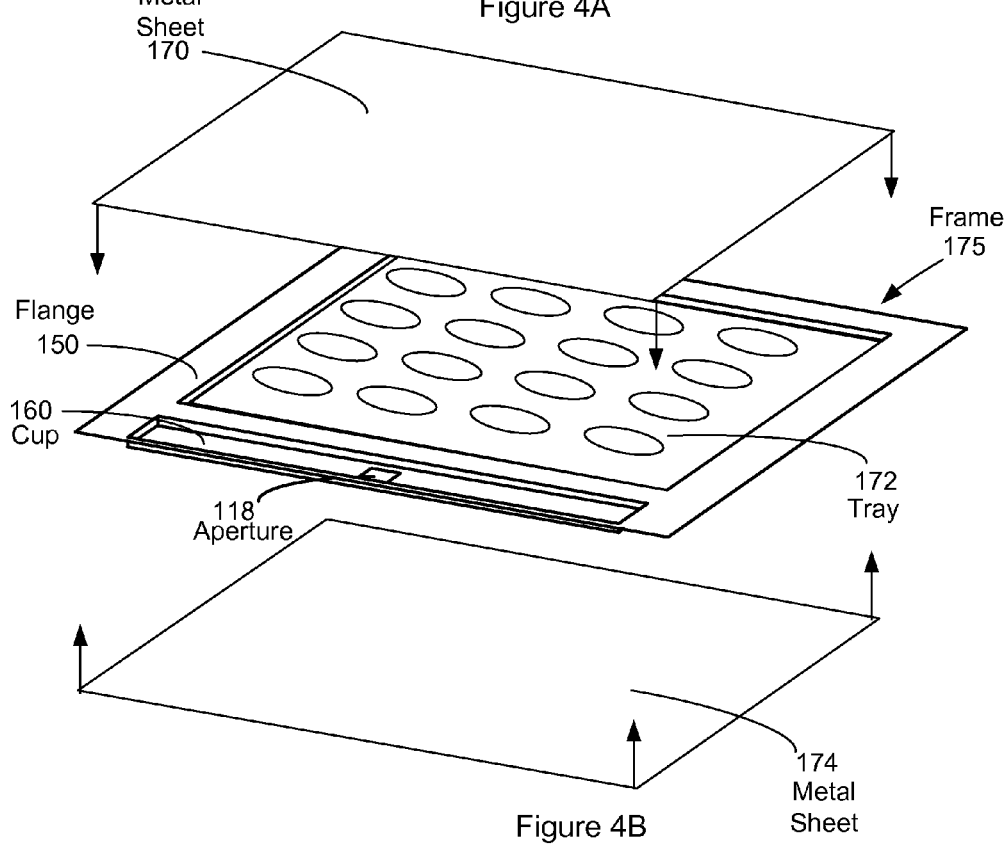
Figure 5:
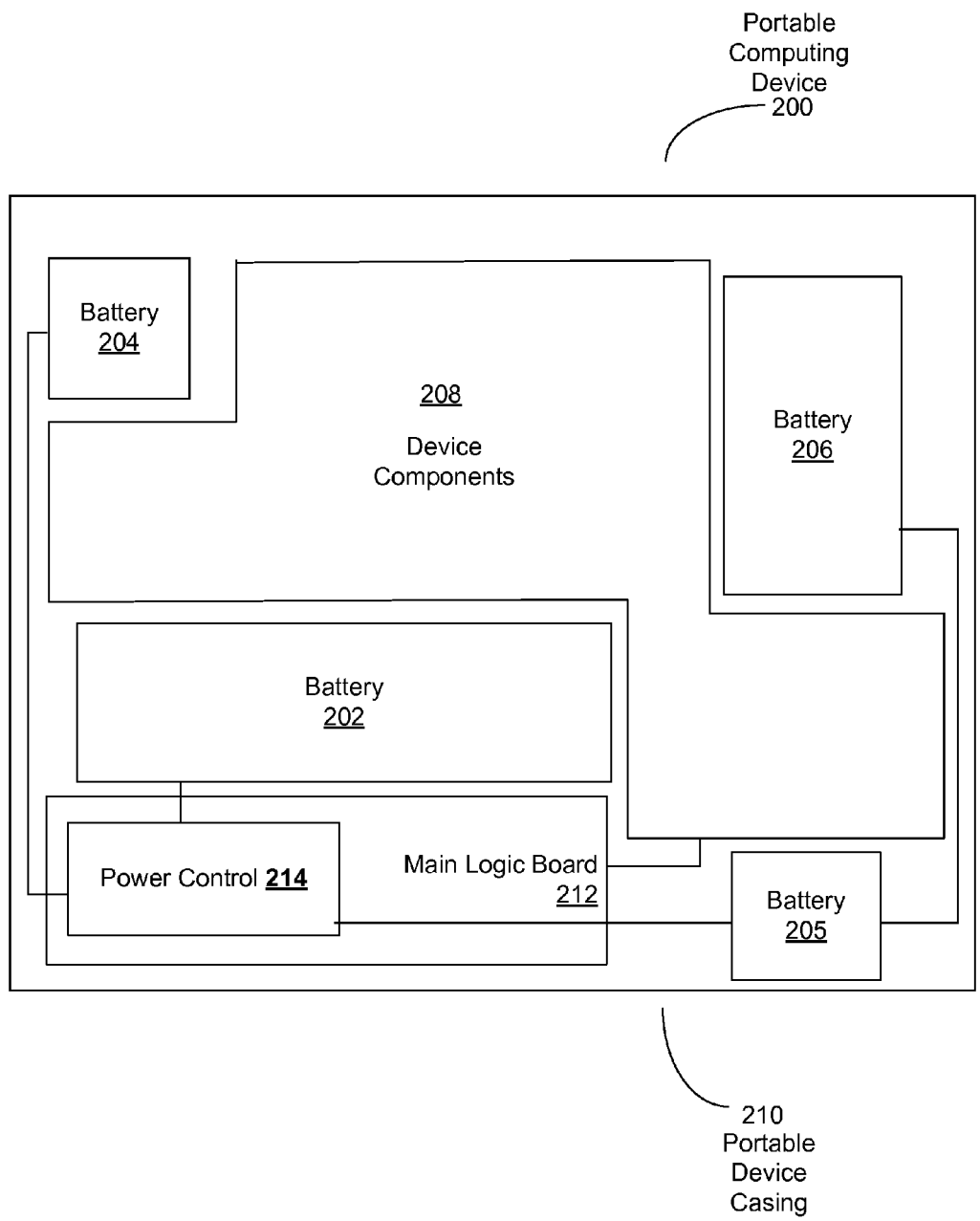
FIG. 5 is a block diagram of a power source distribution scheme for a portable computing device.

FIGS. 4A and 4B are a front view of an unassembled containment structure for enclosing an electrode and associated electrolyte for various embodiments. In FIG. 4A, frame 165 is similar in shape to frame 155 except in no includes a tray 172. An electrode, such as a jelly roll electrode and its associated electrolyte can be placed in the tray and coupled to circuitry, such as safety circuitry, as previously described. A metal sheet, such as a metal foil sheet 170 can then be bonded to frame, such as on the flange surfaces to form a containment structure for the electrolyte. If desired, a metal pouch as previously described can be employed, rather than a metal sheet.

In FIG. 4B, frame 175 is similar to frame 165 except the tray 172 now includes a number of apertures. The tray portion 172 can be used to add additional strength rigidity to the containment structure. The apertures can be utilized to reduce the weight of the frame. In general, one or more transverse members of varying dimensions can be added in the tray area and the tray does not have to be formed with the aperture pattern shown in the figure.

An electrode assembly can be placed in the tray 172. In one embodiment, the metal sheet 174 can already be bonded to the frame 175, such that the apertures are covered, prior to placing the electrode in the tray 172. After the electrode assembly is placed in the tray 172, the metal sheet 170 can be bonded to the frame 175 to cover the electrode. During this process, an electrolyte can be added, allowed to diffuse and the containment structure evacuated as previously described.

FIG. 5 is a block diagram of a power source distribution scheme for a portable computing device 200. The portable computing device can be but is not limited to a laptop computer, netbook computer, tablet computer, smart phone, etc. The portable computing device can comprise output devices, such as display, audio devices and audio interfaces, input devices, such as buttons and a touch screen detector and internal devices, such as a processor, memory and storage devices. The internal devices are shown as device components 208. These devices can be coupled to a portable device casing 210.

The portable computing device 200 can utilize one or more of the portable power sources previously described with respect to FIGS. 1-4B. In FIG. 5, three portable power sources, batteries 202, 204 and 206, are shown. The portable power sources can be the same or different sizes as shown. Each of the batteries, 202, 204 and 206 can have different thicknesses. For example, battery 202 can be 3 mm thick while battery 206 can be 6 mm thick.

The batteries are shown in different locations but can also be coupled to one another. As previously described, the connector pads can be used to couple batteries together. In particular embodiments, the batteries can be coupled together in a stacked configuration. The stacked batteries do not have to totally overlap when stacked. For example, batteries 202 and 206 can be stacked on top of one another perpendicular orientation as shown in FIG. 5. Further, the batteries can be coupled side to side, end to end, side to end. For example, batteries 206 and 202 can be coupled together in an end to side configuration to form a 'T' configuration. When coupled together, the batteries can utilize power conditioning circuitry. The power conditioning circuitry can adjust the voltage of each battery depending on its current charge level, how it is coupled to other batteries, charge levels of other batteries and the requirements of associated device components.

Typical voltage requirements for the device components 208 can be 3.3 volts, 5 volts, 12 volts and a CPU voltage. A typical voltage output for a single Li-ion polymer battery is about 3.7 Volts. The charging voltage is about 4.2-4.3 Volts. The batteries described herein, such as 204, 206 and 208 can also be connected in series. In a series configuration, the output voltage of the connected batteries is increased according to the voltage of each battery in the series. For example, two of the batteries can be connected in series to provide an output voltage of 5 Volts. As another example, four of the batteries can be connected in series to provide an output voltage of 12 Volts.

In particular embodiments, two or more of the Li-ion polymer batteries, such as but not limited 202, 204, 205 and 206 can be connected in a series to produce nominal output voltages between 7-15 Volts. Further, each battery, such as 202, 204, 205 and 206, can include multiple battery cells connected in parallel or series. For instance, battery 202 can include two battery cells connected in series. Thus, the nominal voltage output by each battery, such as 202, 204, 205 and 206, can vary from battery to battery. Also, as previously described, rather than connecting the batteries in series, the voltages of each battery can be increased/decreased as needed to meet the voltage requirements of a particular device.

In particular embodiments, the batteries, 202, 204, 205 and 206 can be connected to power control 214. The power control 214 can be located on a central board or can be part of another board, such as main logic board 212. The power control 214 can include logic, such as charging logic, voltage conversion circuitry, such as voltage regulators and capacitors. The voltage regulators can convert voltages input by the batteries to voltages needed by the device components 208. In particular, embodiments these can be incorporated into the battery or can be separate from the battery. The capacitors can be used to store and to supply extra power where needed to maintain a steady voltage.

In some embodiments, the power control 214 can be configured to dynamically change the output voltages of each battery and/or change how the batteries are connected to one another such that at one time one of the batteries, such as 202, can be connected to one or more of the other batteries, such as 204, 205 or 206, in a series configuration and at another time, the one battery, 202, can operate independently and unconnected from the other batteries. The logic in the power control 214 can be configured to dynamically form and break these connections between batteries.

Further, in a particular embodiment, when the batteries include circuitry to change their output voltage, the power control 214 can be configured to command a battery to change its output voltage. For instance, the power control 214 can be configured to command battery 202 to change its output voltage from 3.5 Volts to 5 Volts. In other embodiments, the circuitry used to change output voltages can be associated with the power control 214. Thus, the power control 214 can be configured to receive power from a battery input at a first voltage and change it to a second voltage and then route the power to a particular device.

The power control 214 can also include routing circuitry to route power to a device from one battery or combinations of batteries at different times. For instance, at a first time, a first device component can receive power from a first battery, such as 202, and at a second time, the first device component can receive power from a second battery, such as 204. In yet other embodiments, certain batteries can be dedicated to power only certain devices. For instance, battery 202 can be dedicated to powering just a display, while batteries 204, 205 and 206 can be dedicated to powering the other device components.

In another embodiment, different batteries can be dedicated to supplying voltage requirements for certain groups of devices. For instance, battery 202 can be dedicated to supplying power for devices requiring 3.3 Volts, battery 204 can be dedicated to supplying power for device requiring 5 Volts, battery 205 can be dedicated to providing a CPU voltage and battery 206 can be dedicated to supplying devices requiring 12 Volts. The batteries can be sized to meet the needs of the component(s) to which they supply power. Thus, the charge capacity of each battery can vary from battery to battery.

Figure 6:
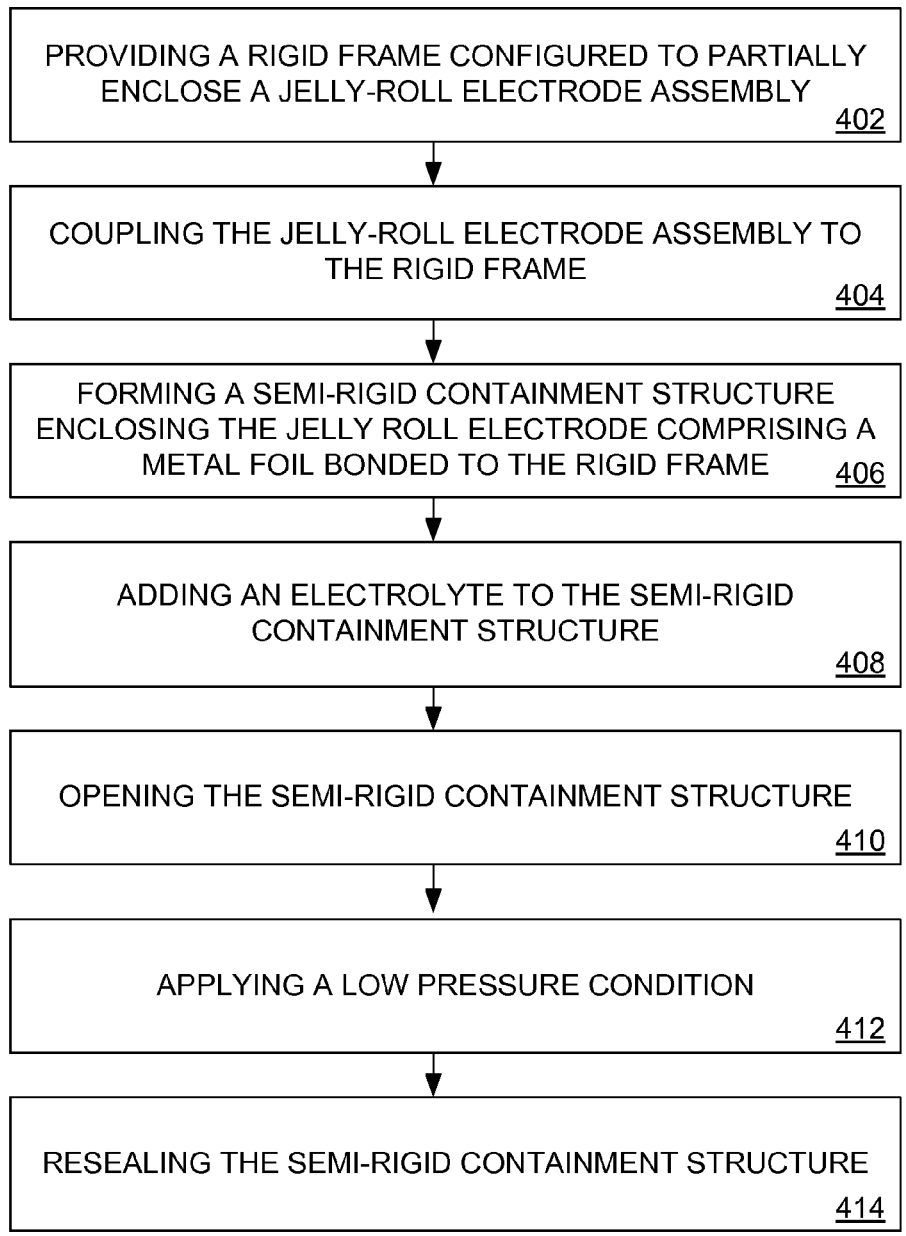
FIG. 6 is a flow chart of a method of generating a portable power source.

FIG. 6 is a flow chart of a method 400 of generating a portable power source. In 402, a rigid frame configured to partially enclose an electrode assembly, such as a jelly roll assembly for a Lithium ion polymer batter is provided. In 404, the jelly roll electrode assembly is coupled to electrical contact tabs associated with safety circuitry. Anode and cathode elements of the jelly roll electrode assembly can be attached to these electrical contact tabs. The electrical contact tabs can be integrated into the rigid frame or can be associated with a board including the safety circuitry that is designed to be coupled to the frame.

In 406, a semi-rigid containment structure can be formed that encloses the jelly roll electrode. The semi-rigid containment structure can comprise a metal foil bonded to the rigid frame. The frame is rigid as compared to the metal foil. The metal foil can include a laminate layer that can be heat sealed to the metal foil. In particular embodiments, the metal foil can be provided as a metal pouch or a metal sleeve that is slid over the frame and the jelly roll electrode.

In 408, a liquid or gel electrolyte can be added to the semi-rigid containment structure and allowed to diffuse over the jelly roll electrode. In one embodiment, the frame can comprise an injection port that provides access to an interior of the semi-rigid containment structure. The injection port can be configured to allow electrolyte to be injected into the containment structure. The direction of the injection can be aligned with the axis of rotation of the electrode jelly roll.

In 410, the semi rigid containment structure can be vented in some manner. For example, a cut can be made in the metal foil of the semi-rigid containment structure. As another example, a hollow needed could be inserted through the injection port. In 412, a low pressure condition can be applied to evacuate the semi-rigid containment structure. For instance, the device can be placed under vacuum conditions. In one embodiment, the rigid frame can include a valve or an interface that allows gasses to be evacuated from the semi-rigid container.

In 414, after the low pressure condition has been applied, it may be necessary to reseal the semi-rigid containment structure. For instance, when a cut is made in the metal foil to vent the containment structure, the cut can be resealed. As another example, an injection port or valve can be covered with an epoxy or some other sealant to permanently seal the device.

The advantages of the invention are numerous. Different aspects, embodiments or implementations may yield one or more of the following advantages. The present invention provides a containment structure for an electrode an associated electrolyte used in a portable power source, such as a battery. The containment structure can comprise a metal foil pouch coupled to a rigid frame. One advantage of the invention is that the containment structure can prevent undesired bending of the electrode, such as an electrode jelly roll. This feature can allow a portable power source including the containment structure to be utilized without additional packaging, such as enclosing the containment structure in a hard-shell casing. Many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A portable computing device comprising:
   a display;
   a processor;
   a memory;
   two or more portable power sources for providing power to the display, the processor and the memory, wherein each of the two or more portable power sources comprises:
      an electrode assembly including an anode and a cathode;
      an electrolyte;
      power conditioning circuitry for changing a voltage output level of the portable power source;
      a containment structure for enclosing the electrode and the electrolyte, the containment structure configured to prevent leakage of the electrolyte or gasses generated during operation of the portable power source; the containment structure comprising:
         a rigid frame;
         a metal foil bonded to the rigid frame wherein the metal foil encloses a portion of the rigid frame, the electrode assembly and the electrolyte; and
         a vent configured to evacuate the containment structure which places the containment structure in a low pressure condition under vacuum;
      an electrical connector pad coupled to the rigid frame for drawing power from the portable power source; and
      safety circuitry coupled to the rigid frame; the safety circuitry electrically coupled to the electrical connector pad and the anode and the cathode of the electrode assembly; and
   power control circuitry separate from the two or more portable power sources, wherein the power control circuitry is configured to command each of the two or more portable power sources to change their voltage output level using the power conditioning circuitry.

2. The portable computing device of claim 1, wherein the power control circuitry is further configured to allow the two or more portable power sources to be operated in parallel mode, in a series mode or an independent mode.

3. The portable computing device of claim 2, wherein the power control circuitry is further configured to switch the two or more portable power sources between the parallel, series and the independent operational modes.

4. The portable computing device of claim 1, wherein the electrode assembly and the electrolyte form a lithium ion polymer battery cell.

5. A portable power source, the portable power source comprising:
   an electrode assembly including an anode and a cathode;
   an electrolyte;
   a containment structure for enclosing the electrode and the electrolyte, the containment structure configured to prevent leakage of the electrolyte or gasses generated during operation of the portable power source; the containment structure comprising:
      a rigid rectangular-shaped frame,
      a metal foil bonded to the rigid rectangular-shaped frame,
         wherein the metal foil encloses a portion of the rigid rectangular-shaped frame, the electrode assembly and the electrolyte,
         wherein a portion of the bond between the rigid rectangular-shaped frame and the metal foil prevents the electrolyte or the gasses from escaping the containment structure, and
      a vent configured to evacuate the containment structure which places the containment structure in a low pressure condition under vacuum;
   an electrical connector pad coupled to the rigid rectangular-shaped frame for drawing power from the portable power source; and
   safety circuitry coupled to the rigid frame; the safety circuitry electrically coupled to the electrical connector pad and the anode and the cathode of the electrode assembly.

6. The portable computing device of claim 1, wherein the portable computing device is selected from the group consisting of a laptop computer, a netbook computer, a tablet computer, a smart phone and a portable media player.

7. The portable computing device of claim 1, wherein the rigid frame includes an injection port and the electrolyte is added to the containment structure via the injection port.

8. The portable computing device of claim 1, wherein the metal foil is provided as a metal pouch or as a metal sleeve.

9. The portable computing device of claim 1, wherein the metal foil is heat sealed to the rigid frame.

10. The portable computing device of claim 1, wherein the metal foil includes a laminate layer between the metal foil to the rigid frame.

11. The portable computing device of claim 1, wherein the electrode assembly comprises a jelly roll electrode assembly.

12. The portable computing device of claim 1, wherein the metal foil is aluminum.

13. The portable computing device of claim 1, wherein the metal foil is between 80 to 150 microns thick.

14. The portable computing device of claim 1, wherein the rigid frame includes a corner and wherein the metal foil is bonded to the rigid frame around the corner.

15. The portable computing device of claim 14, wherein the bond around the corner of the rigid frame prevents the electrolyte or the gasses from escaping the containment structure.

16. The portable computing device of claim 1, further comprising electrical connector pads, wherein the safety circuitry and the electrical connector pads are integrated into the rigid frame.

17. The portable computing device of claim 1, further comprising electrical connector pads, wherein the safety circuitry and the electrical connector pads are integrated into a board that is bonded to the rigid frame during assembly.

* * * * *